UNITED STATES PATENT OFFICE.

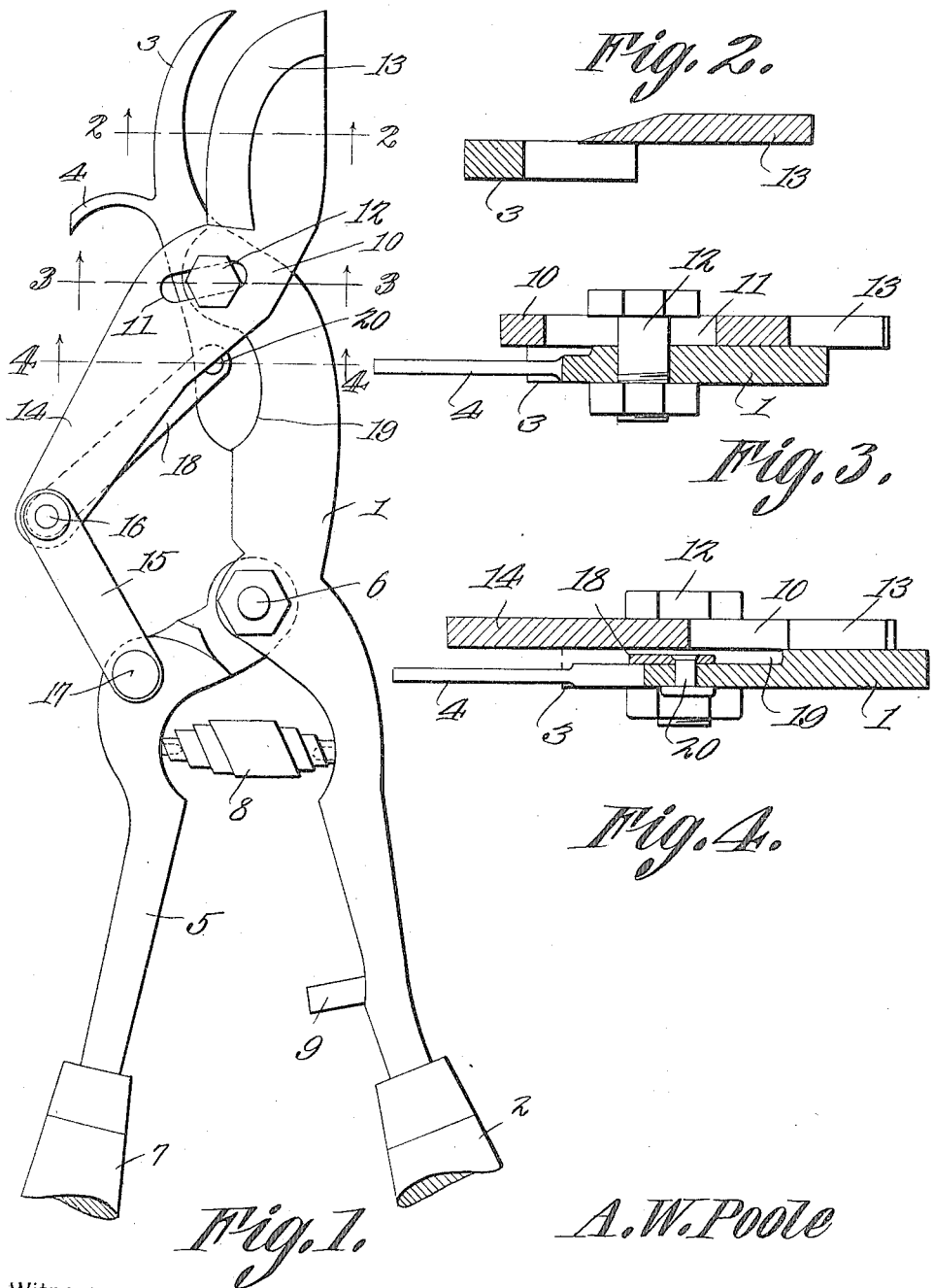

ALFRED W. POOLE, OF COVINA, CALIFORNIA.

PRUNING-SHEARS.

1,196,278.  Specification of Letters Patent.  Patented Aug. 29, 1916.

Application filed January 8, 1916. Serial No. 71,020.

*To all whom it may concern:*

Be it known that I, ALFRED W. POOLE, a citizen of the United States, residing at Covina, in the county of Los Angeles and State of California, have invented new and useful Pruning-Shears, of which the following is a specification.

The present invention appertains to pruning shears, and aims to provide a novel and improved device of that character which is comparatively simple and inexpensive in construction, and which is thoroughly practical and efficient in operation, the same providing a powerful leverage whereby comparatively large branches can be cut.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the pruning shears, portions of the handles being broken away. Figs. 2, 3, and 4 are enlarged cross sectional views taken on the respective lines 2—2, 3—3 and 4—4 of Fig. 1.

In carrying out the invention, there is provided a lever 1 provided at one end with a suitable handle 2, and at its other end with a curved jaw or hook 3. The lever 1 also has an outstanding hook 4 at the butt end of the jaw 3 for engaging branches, whereby the branches can be pulled downwardly within reach.

A second lever 5 has one end pivoted, as at 6, to the lever 1 between the ends thereof, and the lever 5 is provided at its free end with a handle 7 coöperating with the handle 2 whereby the levers can be conveniently oscillated relative to one another for operating the shears. The levers 1—5 are preferably separated by means of a suitable spring 8 disposed therebetween, and the lever 1 has an outstanding stop 9 against which the lever 5 will contact before the handles 2 and 7 strike one another, thus preventing the pinching of the fingers.

The shears embodies a third lever 10 which crosses the lever 1, or rather the outer arm thereof adjacent the butt end of the jaw 3, and the lever 10 is provided between its ends with a diagonal or oblique slot 11. A bolt or other element 12 is engaged rigidly with the lever 1 and extends through the slot 11, whereby the lever 10 is guided for oblique movement upon one side of the lever 1. The outer arm of the lever 10 is in the form of a cutter blade 13 coöperating with the jaw 3 for severing the branches, and the inner arm 14 has its end connected by a link 15 with the lever 5 adjacent the pivot or fulcrum 6 of the levers 1 and 5. A pivot 16 connects the link 15 and arm 14, and a pivot 17 connects the link 15 and lever 5. The pivot 16 is connected by a link 18 arranged adjacent the lever 10 to a pivot 20 carried by the lever 1 adjacent the bolt or guide element 12. That end of the link 18 pivoted to the lever 1 is disposed within a recess 19 of said lever 1, or is disposed between the levers 1 and 10. The links 15 and 18 provide toggle links to the joint of which the inner end of the lever 10 is pivotally connected.

The shears is used in the ordinary manner, the handles 2 and 7 being swung toward one another to cut the branch or other object disposed between the jaw 3 and blade 13. When the levers 1 and 5 are swung toward one another, the link 15 being pulled inwardly by the lever 5, will pull the lever 10 inwardly, and the bolt 12 in working within the slot 11 will cause the lever 10 to shift toward the jaw 3 in a powerful manner, whereby the branch will be severed effectively. The link 18 holds the link 15 and lever 10 in proper operative position whereby the inner end of the lever 10 is constrained to swing on an arc having the pivot 20 as a center. The lever 10 being linked to the lever 5 will naturally be swung when the lever 5 is swung toward the lever 1, and the sliding connection between the levers 10 and 1 will assist in forcing the blade 13 toward the jaw 3 in a powerful manner.

Having thus described the invention, what is claimed as new is:

1. Shears comprising a lever having a jaw at its outer end, a second lever pivoted to the first mentioned lever remote from the jaw, a third lever crossing the first mentioned lever and slidably connected therewith adjacent said jaw, the third lever having an outer arm providing a cutter cooperating with said jaw and having an inner arm, and a pair of links pivoted to said arm, one of said links being pivoted to the second lever and the other being pivoted to the first mentioned lever adjacent the third lever.

2. Shears comprising a lever having a jaw at its outer end, a second lever pivoted to the first mentioned lever remote from the jaw, a third lever crossing the first mentioned lever adjacent said jaw and having an oblique slot between its ends, a third lever having a cutter coöperating with said jaw and having an inner arm, the first mentioned lever having an element extending through said slot, and a pair of links pivoted to said arm, one link being connected to the second lever, and the other being pivotally connected with the first mentioned lever adjacent said element.

In testimony that I claim the foregoing as my own, I have hereto affixed my signature in the presence of two witnesses.

ALFRED W. POOLE.

Witnesses:
S. DOUGLAS,
GORDON C. DOUGLAS.

Copies of this patent may be obtained for five cents each, by addressing the "Commissioner of Patents. Washington, D. C."